United States Patent
Stamenkovic

(10) Patent No.: US 8,442,679 B2
(45) Date of Patent: May 14, 2013

(54) METHOD AND DEVICE FOR HANDLING AN OBJECT WITH THE AID OF A LOCATION SYSTEM

(75) Inventor: Milan Stamenkovic, Stuttgart (DE)

(73) Assignee: Stotz Feinmesstechnik GmbH, Gerlingen (DE)

( * ) Notice: Subject to any disclaimer, the term of this patent is extended or adjusted under 35 U.S.C. 154(b) by 1625 days.

(21) Appl. No.: 10/530,641

(22) PCT Filed: Oct. 6, 2003

(86) PCT No.: PCT/EP03/11036
§ 371 (c)(1),
(2), (4) Date: Oct. 25, 2005

(87) PCT Pub. No.: WO2004/033162
PCT Pub. Date: Apr. 22, 2004

(65) Prior Publication Data
US 2006/0155459 A1    Jul. 13, 2006

(30) Foreign Application Priority Data
Oct. 8, 2002   (DE) .................................. 102 46 783

(51) Int. Cl.
*G05B 19/04*        (2006.01)
*G05B 19/418*       (2006.01)
(52) U.S. Cl.
USPC ........... 700/247; 700/245; 700/252; 700/253; 700/255; 700/258
(58) Field of Classification Search .......... 700/245–264; 342/104–158, 350–458
See application file for complete search history.

(56) References Cited

U.S. PATENT DOCUMENTS

| | | | | |
|---|---|---|---|---|
| 4,651,283 A | * | 3/1987 | Sciaky et al. | 700/207 |
| 5,219,264 A | * | 6/1993 | McClure et al. | 414/730 |
| 5,438,771 A | * | 8/1995 | Sahm et al. | 37/348 |
| 5,637,973 A | * | 6/1997 | Hirai et al. | 318/640 |
| 5,835,693 A | * | 11/1998 | Lynch et al. | 345/473 |
| 5,862,501 A | * | 1/1999 | Talbot et al. | 701/50 |
| 5,947,051 A | * | 9/1999 | Geiger | 114/313 |
| 5,974,348 A | * | 10/1999 | Rocks | 701/28 |
| 6,032,084 A | * | 2/2000 | Anderson et al. | 700/241 |

(Continued)

FOREIGN PATENT DOCUMENTS

| | | |
|---|---|---|
| DE | 3930945 A1 | 3/1991 |
| DE | 69501205 T2 | 7/1998 |

(Continued)

OTHER PUBLICATIONS

Ylonen, S.J. et al.; "Workpartner—Centaur like Service Robot"; *Proceedings of the 2002 IEEE/RSJ International Conference on Intelligent Robots and Systems*; Oct. 2002; pp. 727-732; vol. 1 of 3; IEEE; New York, NY.

*Primary Examiner* — Khoi Tran
*Assistant Examiner* — Bhavesh V Amin
(74) *Attorney, Agent, or Firm* — Kilpatrick Townsend & Stockton LLP

(57) ABSTRACT

An object handling method for determining the positions of the arm of a handling system with the aid of a location method which is based on a reference system predetermined by an associated location system. A handling system having a moveable arm. The arm is operational within a fixed reference system using a location system.

19 Claims, 1 Drawing Sheet

U.S. PATENT DOCUMENTS

| | | | |
|---|---|---|---|
| 6,035,254 A * | 3/2000 | Nichols | 701/469 |
| 6,330,503 B1 * | 12/2001 | Sharp et al. | 701/50 |
| 6,516,248 B2 * | 2/2003 | McGee et al. | 700/254 |
| 6,826,452 B1 * | 11/2004 | Holland et al. | 700/245 |
| 6,898,484 B2 * | 5/2005 | Lemelson et al. | 700/245 |
| 7,233,837 B2 * | 6/2007 | Swain et al. | 700/186 |
| 7,259,535 B1 * | 8/2007 | Pastusak et al. | 318/568.21 |
| 7,310,889 B2 * | 12/2007 | Stamenkovic | 33/503 |
| 2003/0142587 A1 * | 7/2003 | Zeitzew | 367/127 |
| 2003/0208302 A1 * | 11/2003 | Lemelson et al. | 700/245 |
| 2010/0141506 A1 * | 6/2010 | Gulden et al. | 342/25 B |

FOREIGN PATENT DOCUMENTS

| | | |
|---|---|---|
| DE | 19814630 A1 | 9/1999 |
| DE | 19823756 A1 | 9/1999 |
| DE | 19655008 A1 | 6/2001 |
| DE | 10029953 A1 | 1/2002 |
| EP | 0846248 B1 | 10/2001 |
| EP | 1252968 A1 | 10/2002 |
| JP | 05038690 A | 2/1993 |
| SE | 444530 B | 4/1986 |

* cited by examiner

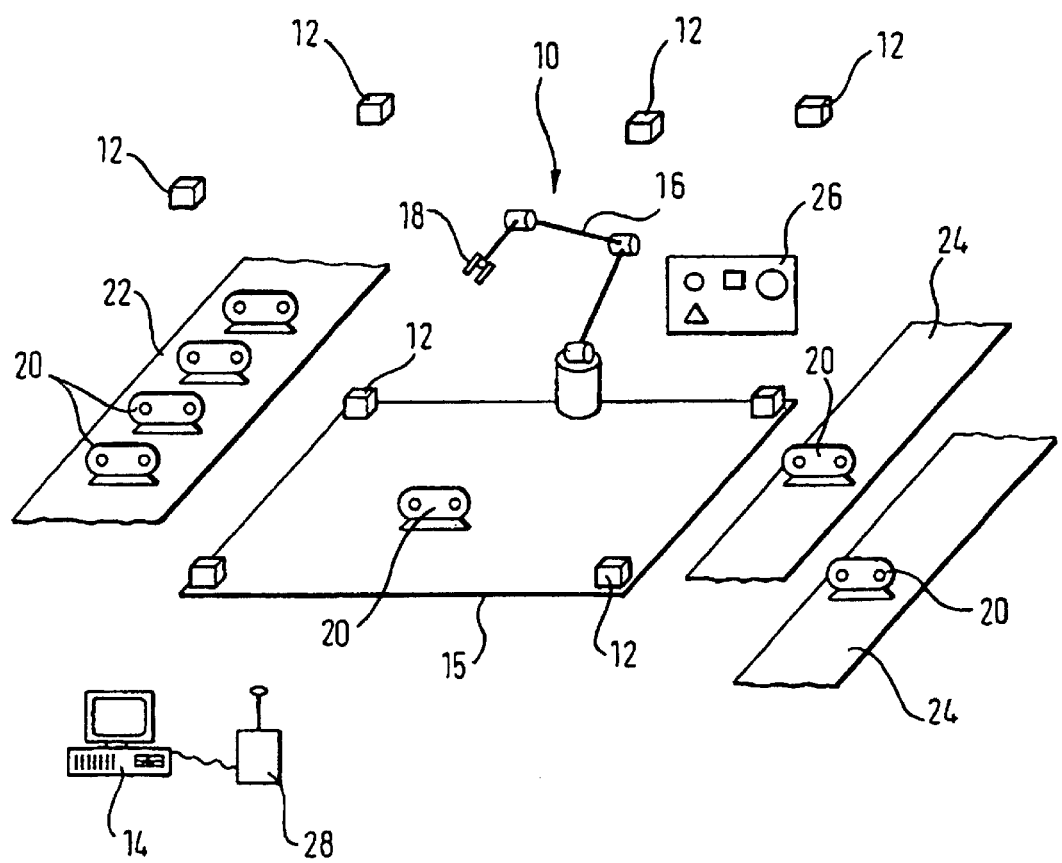

METHOD AND DEVICE FOR HANDLING AN OBJECT WITH THE AID OF A LOCATION SYSTEM

BACKGROUND OF THE INVENTION

The invention relates to a method and to an apparatus for the handling of objects.

It is known to use a robot for the handling of objects. A robot having, for example, one gripping arm can be used for the loading and unloading and for the equipping of production apparatuses with workpieces to be processed. The robot can furthermore itself serve for assembly, such as for welding, since a robot arm can be provided with tools and can also carry out complicated manipulations. To move the robot arm in space, linear x, y and z transducers and incremental encoders are provided which are connected to a control computer. However, contamination of the transducers and incremental encoders by water or oil used in production halls and by chips which occur there can result in operational problems for the robot by which an accurate locating of the robot arm is no longer ensured.

SUMMARY OF THE INVENTION

It is an object of the present invention to provide an improved apparatus and an improved method for the handling of objects with which the aforesaid disadvantages are at least very largely eliminated.

The object is satisfied by the features disclosed herein.

The object is in particular satisfied in that, in a method for the handling of objects in which at least one arm of a handling system for the handling of at least one object is moved in space relative to a reference system, in particular a fixed reference system, the locations of the arms are determined by a locating method with reference to the reference system fixed by the associated locating system.

The use of the locating method permits a very precise determination of the locations of the arm of the handling system without having to use transducers and incremental encoders which are prone to problems. At the same time, it is possible to steer to points in space much more precisely with the arm. This has the consequence that imprecise manipulations of the arm and—if the handling system is used in production—thus also the generation of rejects can be avoided. The location determination moreover takes place much faster due to the locating method than via the previously used transducers and incremental encoders.

At least one physical field, in particular an acoustic, optical and/or electromagnetic field, can be set up for the location of the arm. For this purpose, a plurality of transmitters are located in the space around the handling system as field sources of the physical field, for example sources for visible and/or invisible light, whose locations fix the reference system for the locating method. The arm is furthermore provided with at least one sensor for the physical field. Since the propagation speed of the physical field is known, the distance between the transmitters and the arm of the handling system can be precisely determined from the signal transit time. To determine the location of the arm as precisely as possible, it is favorable to distribute a high number of transmitters in the space. This permits the determination of the location of the arm with an accuracy of approximately up to ±1 μm. The handling system in accordance with the invention can moreover be set up substantially more easily than known handling apparatuses due to the use of the locating system.

It is particularly advantageous for a unidirectional locating system, in particular in the manner of the so-called global positioning system, GPS, to be used for the locating of the arm. A one-way distance measurement is carried out in this process by means of the transit time of the signals between the transmitters and corresponding sensors at the arm of the handling system. The measuring error can be kept small in this manner and the determination of the location of the arm can be carried out very precisely.

In an embodiment, a robot arm can be used as the arm. The advantages presented above can thus also be achieved with industrial robots. This is in particular of importance when using the robot at dangerous workplaces, for example in cooling ponds of nuclear power stations. The method in accordance with the invention and the associated handling system can also be used under water since the locating system works reliably under water unlike the linear transducers and incremental encoders of the known systems.

A gripping arm of a robot which takes up and/or moves the object can be used as the arm. This permits a variety of manipulations of the object so that, in a favorable case, only one robot can take over all necessary manipulations of the object in the space.

An exchangeable tool or a tool fixedly provided at the arm can furthermore be handled as the object in the space. The method in accordance with the invention thus permits not only the manipulation of objects, but also their processing, for example assembly and welding work.

It is advantageous for the relative orientation of the tool to the arm to be determined, in particular independently of the locating system. The operating point of the tool at an object to be worked can thereby be steered to very precisely. If the orientation determination should take place independently of the locating system, at least one sensor, for example a proximity sensor, independent of the physical field of the locating system is arranged in the tool and/or in the arm of the handling system.

In a further embodiment, the tool can be supplied with energy in a wireless manner, in particular inductively or by means of an accumulator. Control data of the tool can moreover be transmitted in a wireless manner, in particular inductively or by radio. The tool at the arm of the handling system can in this manner be exchanged simply in that a gripping element provided at the arm releases a first tool and takes up another tool, since the tools have an autonomous energy supply and/or an autonomous control.

It is furthermore of advantage for the locating system to be calibrated by self-calibration. This permits a recalibration of the locating system carried out at short time intervals.

Further advantageous embodiments of the invention are recited in the following FIGURE description and in the drawings.

The invention will be described in the following purely by way of example and with reference to the enclosed drawing.

BRIEF DESCRIPTION OF THE DRAWINGS

FIG. 1 is a perspective view of an embodiment of an apparatus in accordance with the invention in a schematic representation.

DESCRIPTION OF THE PREFERRED EMBODIMENTS

The embodiment of the apparatus in accordance with the invention shown in FIG. 1 includes a robot 10, transmitters 12 distributed in the space around the robot and a control computer 14.

The robot 10 is mounted on a work table 15 and has a gripping arm 16 at whose free end a grip 18 is provided. The grip 18 serves, on the one hand, to pick up tools 20 from a supply belt 22 and to place them on the work table 15 and to transfer them onto take-away belts 24 after their working. In addition, on the other hand, a tool can be taken up from the tool storage position 26 by the grip 18 and one of the workpieces 20 on the work table can be worked.

The transmitters 12 are arranged both in the space and on the measuring table 15. They transmit an electromagnetic field, for example a radio signal, in particular a GPS signal.

A field sensor (not shown here) is provided in or at the grip 18 for the electromagnetic field generated by the transmitters 12. The grip 18 furthermore has a transmitter and receiver element (not shown) which transmits the signals of the transmitters 12 received by the field sensor to a transmitter and receiver module 28 of the control computer 18.

The tools taken up from the tool storage position 26 have a wireless energy supply (not shown here) and a transmitter and receiver element (likewise not shown) for wireless communication with the control computer 14. Consequently, a tool can be used for the working of the workpiece 20 directly after having been taken up by the grip 18.

The control computer 14 serves for the processing of the signals of the transmitters 12 and also for the calculation of the control signals for the transmitters 12, for the robot 10 and for the tools from the tool storage position 26. For this purpose, the transmitter and receiver module 28 of the control computer 14 receives the signals of the transmitters 12 and moreover transmits control signals to the transmitters 12, to the robot 10 and to a tool taken up from the tool storage position 26. The transmitter and receiver module 28 moreover receives the signals of the field sensor, which is provided for the detection of the electromagnetic field of the transmitters 12 at the grip 18.

A proximity sensor, which is independent of the electromagnetic field of the transmitters 12, is provided in the grip 18 for the fine positioning of a tool taken up by the grip 18. The orientation of the tool relative to the grip 18 or to the gripping arm 16 can be measured using this proximity sensor. If the orientation of the tool to the grip arm 16 should not be ideal for a working of the workpiece 20, it can be compensated simply by suitable movements of the gripping arm 16 or of its arm segments. For this purpose, the proximity sensor has a transmitter and receiver element (not shown) which is connected to the transmitter and receiver module 28 of the control computer so that the coordination of the movements of the gripping arm 16 can be carried out by the control computer 14 while taking account of the relative orientation of the tool to the gripping arm 16.

For the working of a workpiece 20, the first workpiece 20 on the supply belt 22 to be worked is taken up by the grip 18 of the robot 10 and placed on the work table 15. The workpiece 20 is there fixed on the table, for example by an electromagnet. The grip 18 then grips a tool of the storage position 26 which is needed for the desired working of the workpiece 20. Since the tool has its own energy supply and receives independent control signals, it can be used immediately after the grip has taken it up. The robot 10 now moves its gripping arm 16 to the workpiece 20, while taking account of the relative orientation of the tool to the grip 18, in order to process the workpiece 20 in a suitable manner. After the end of this working step, the tool 20 is transferred by the gripping arm 16, after the gripping arm 16 has again positioned the tool on the tool storage position 26, to one of the take-away belts 24 to then supply the workpiece 20 to a subsequent work step.

The movements of the gripping arm 16 required for the work step described are controlled by the control computer 14 in that it uses the signals of the transmitters 12 received by the field sensor of the grip 18 for the calculation of the location of the grip 18. The distances between the field sensor and the transmitters 12 are determined from the product of the propagation speed of the electromagnetic field, which is known, and of the transit time of the respective signal. The current locations of the grip 18 relative to the transmitters 12 can thus be determined while the gripping arm 16 is in use. The locations of the gripping arm 18 in space can be determined very precisely in this manner and desired locations can moreover be steered to and set precisely.

The apparatus in accordance with the invention and the method in accordance with the invention above all permit a determination of the location of the gripping arm 18 or of the grip 16 with a precision of up to ±1 μm due to the use of the locating system or of the locating method.

Alternatively, light sources or sound sources, for example ultrasonic sources, can also be used as transmitters 12 for the electromagnetic field, alone or combined with one another. The field sensors at the gripping arm 16 can then consist of optical or acoustic interferometers which determine phase shifts for the determination of location.

A field sensor for the electromagnetic field of the transmitters 12 can be provided for the location determination not only in or at the gripping arm 16 and/or in or at the grip 18, but also in the tools of the tool storage position 26.

The handling system or handling method described can, for example, also be used under water in nuclear power stations.

The invention claimed is:

1. A method of handling objects, the method comprising:
    moving at least one arm of a handling system for the handling of at least one object in space relative to a fixed reference system
    wherein the locations of the arm are determined with reference to the fixed reference system, wherein the fixed reference system comprises a plurality of transmitters spatially arranged around the at least one arm handling system to define a volume of space; and
    locating the plurality of transmitters in the space around the handling system as field sources of at least one physical field for the location of the arm within the volume of space,
    wherein the at least one arm is mounted to a work table.

2. A method in accordance with claim 1, wherein the at least one physical field is an acoustic, optical and/or electromagnetic field.

3. A method in accordance with claim 2, wherein the at least one physical field includes a unidirectional locating system for locating of the arm.

4. A method in accordance with claim 1, wherein a robot arm is used as the arm.

5. A method in accordance with claim 1, wherein a gripping arm of a robot which takes up and/or moves the object is used as the arm.

6. A method in accordance with claim 1, wherein an exchangeable tool or a tool fixedly provided at the arm is handled as the object in the space.

7. A method in accordance with claim 6, wherein the relative orientation of the tool to the arm is determined, in particular independently of the locating system.

8. A method in accordance with claim 6, wherein the tool is supplied with energy in a wireless manner, in particular inductively or by means of an accumulator.

9. A method in accordance with claim 6, wherein control data of the tool are transmitted in a wireless manner, in particular inductively or by radio.

10. A method in accordance with claim 1, wherein the locating system is calibrated by self-calibration.

11. A method in accordance with claim 1, wherein the plurality of transmitters of the fixed reference system are directly proximate to the arm and are electronically coupled to a control computer.

12. A method in accordance with claim 11, wherein a communications element of the arm receives signals from the plurality of transmitters and transmits the received signals to the control computer for determination of the locations of the arm within the fixed reference system.

13. A method in accordance with claim 12, further comprising:
 receiving, at the control computer, an independent signal from an independent proximity sensor located in a tool-holding grip of the arm;
 measuring the orientation of a tool relative to the tool-holding grip or arm according to the received independent signal; and
 compensating a position of the tool-holding grip according to the measured orientation.

14. A method in accordance with claim 1, wherein the transmitters are structurally affixed in respective locations relative to the arm.

15. A method in accordance with claim 14, wherein the transmitters comprise sound sources.

16. A method in accordance with claim 14, wherein the transmitters comprise light sources.

17. A method in accordance with claim 14, wherein the arm and transmitters are submerged in water.

18. A method in accordance with claim 1, further comprising determining location of the at least one arm within the volume of space with an accuracy of $\pm 1$ µm.

19. A method in accordance with claim 18, wherein the location of the at least one arm is determined from propagation speed of the physical field and transit time of a reference signal transmitted by the at least one arm within the volume.

* * * * *